(No Model.) 2 Sheets—Sheet 1.
C. C. MILLER.
PORTABLE WAGON SCALE.
No. 534,962. Patented Feb. 26, 1895.
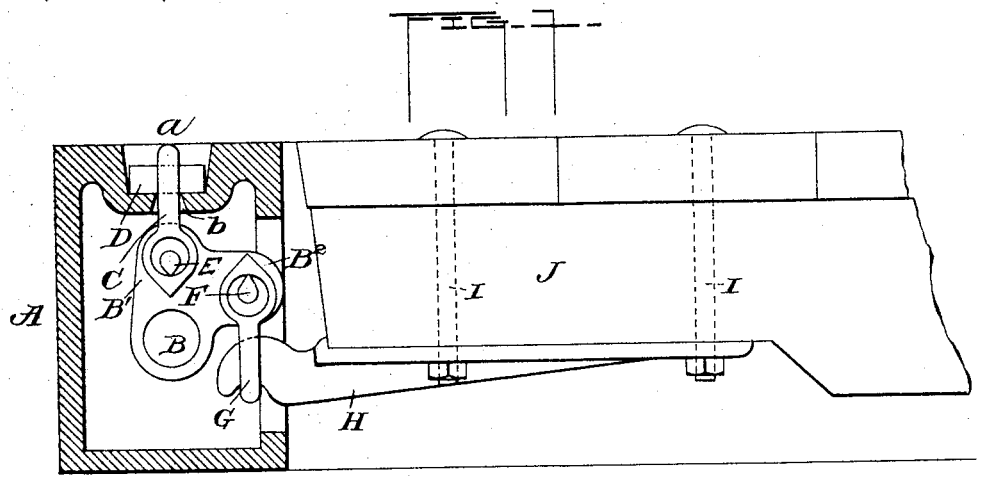
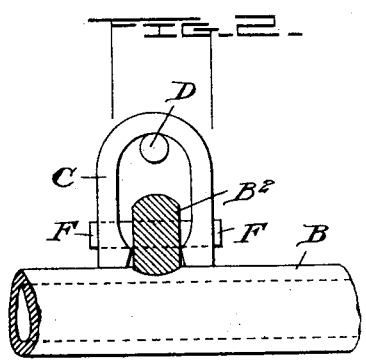
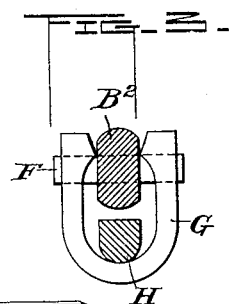
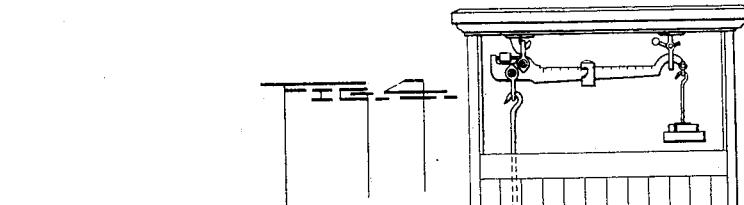
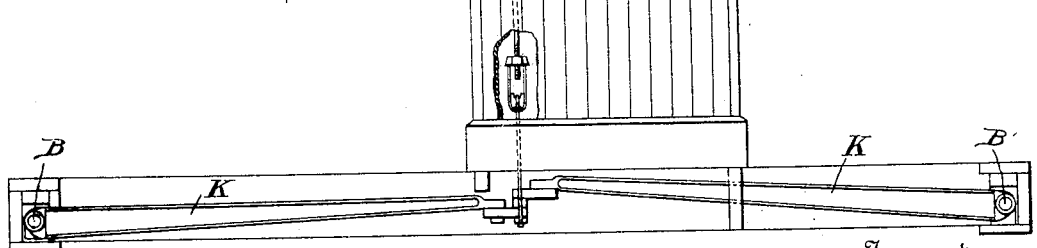
Witnesses
Inventor
Charles C. Miller,
by Chas. L. Sturtevant,
his Attorney

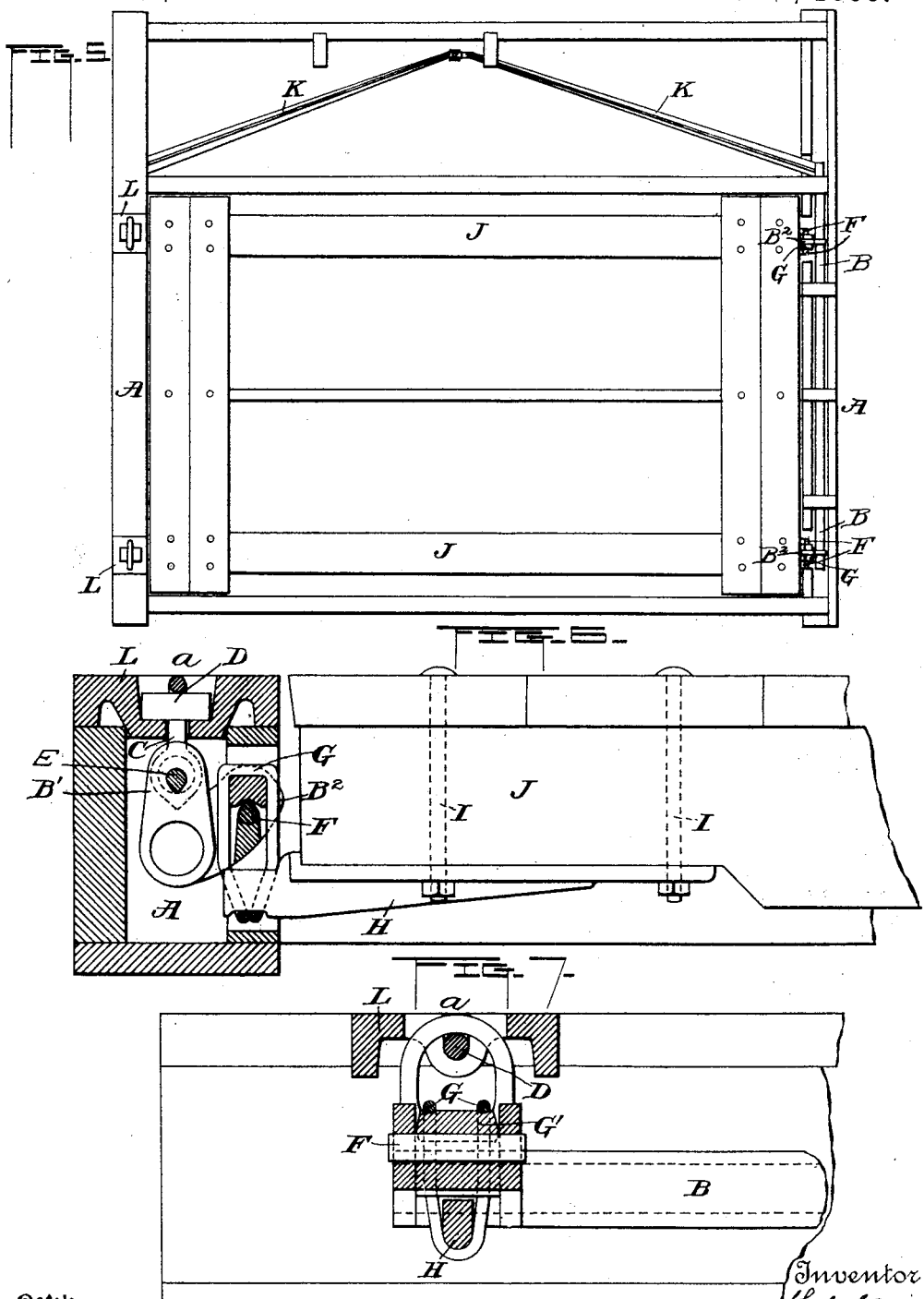

UNITED STATES PATENT OFFICE.

CHARLES C. MILLER, OF NEW YORK, N. Y.

PORTABLE WAGON-SCALE.

SPECIFICATION forming part of Letters Patent No. 534,962, dated February 26, 1895.

Application filed May 7, 1894. Serial No. 510,365. (No model.)

*To all whom it may concern:*

Be it known that I, CHARLES C. MILLER, a citizen of the United States, residing at New York, in the county of New York, State of New York, have invented certain new and useful Improvements in Portable Wagon-Scales, of which the following is a description, reference being had to the accompanying drawings, and to the letters of reference marked thereon.

My invention relates to an improvement in platform scales and particularly to wagon scales which are usually of from two to ten tons capacity. These scales as ordinarily constructed occupy from two to three feet in depth and it frequently happens in places where such a scale is desired that the ground is so filled with moisture that the vault in which they are usually placed would fill with water, in which case in order to provide a scale it would be necessary to elevate the parts above the ground, but when elevated to such an extent it is very hard to drive thereon with a loaded wagon; or if the approach be so gradual that a loaded team can reach the platform without difficulty said approach must be of such length as to be very costly of construction and furthermore interfere with traffic by obstructing the roadway. The same objection to the great height of these scales is met with in buildings constructed of iron, where the scale must rest on the floor beams and yet not be too high to drive upon with a loaded wagon. So, also, on wharves or docks where a scale is needed to weigh ore, coal, or other articles in bulk, the municipal authorities will not allow the dock to be cut or the street to be opened to set a scale of the ordinary pattern requiring so great a depth. So, also, it is very costly to construct a scale of such proportions for a temporary purpose, such as for schools, hospitals, public buildings and the like where they require a scale capable of weighing great amounts only periodically to weigh supplies of coal and the like. Hence my scale possesses great advantages in that it is portable, that is, it can be readily set up or taken down without requiring any amount of work to form its bed. It can be readily seen that the cost of foundation and equipment of a scale from two to three feet in depth and of the usual wagon, hay and stock scale construction would be so great as to be almost prohibitive of its use when required only at long intervals of time. Furthermore, although there has been for many years a demand for a wagon scale of less depth than those manufactured by scale makers and attempts have been made to meet this demand, all such so far as I am aware have been made shallow at the expense of quality.

My object is to make a scale equally as good if not better and at the same time so arrange the parts that less than one-half the depth is required than is usual in setting a scale of the same capacity; *i. e.*, I can build a five ton scale in ten inches of depth or less if necessary.

To accomplish this object my invention therefore consists primarily in a rearrangement of the operating parts of the scale, the supporting pipe levers and corner irons being placed alongside the platform instead of below as is customary.

It further consists in placing this mechanism within inclosing boxes on each of two sides of the scale, which boxes form part of the frame or coping of the scale and bring the platform and mechanism on the same plane.

Finally it consists in various details of construction all as hereinafter described and referred to in the appended claims.

My invention is illustrated in the accompanying drawings, in which—

Figure 1 is a sectional elevation of one corner of a wagon scale embodying my invention. Figs. 2 and 3 are detail views partly in section of portions of the scale. Fig. 4 is a front elevation of a scale constructed in accordance with my invention. Fig. 5 is a plan view with the standard removed. Fig. 6 is a view similar to Fig. 1 of a modified construction of scale containing my invention; and Fig 7 is a view partly in section at right angles to Fig. 6.

In the drawings the upright standard, scale beam, steelyard rod and parts above the platform are all of ordinary and well known construction.

The foundation of the scale if permanent may be of stone or brick or any other suitable material, but I have herein shown the inclosing casing and framework as being of wood and iron or all of iron. The platform may also be of wood or iron. The front and rear ends of the scale framework are of usual construction and material.

Referring to the drawings, A represents the boxes in which the pipe levers and loops supporting the platform at each corner are placed, these boxes as shown in Fig. 1 being made of iron and closed except for the necessary openings to allow of the passage of the loop supporting the pipe levers, and the bearing for the platform. In this figure and the sectional views, Figs. 2 and 3, B represents the pipe levers running lengthwise of the box being connected at one end with the levers K obliquely arranged which transmit the weight through the proper connection to the scale beam.

Each box at each corner has a countersunk central portion $a$ in which is placed a pin or rod D, while an opening or openings $b$ through the box permit the passage of the sides of a clevis C which is suspended from the pin or rod D. The depth of the countersink in the corner of the box is equal to or slightly more than the thickness of the pin D and clevis C and in practice I provide a corner plate which fits over the box keeping dirt and moisture away from the parts C and D. Each pipe has at either end a projecting portion shaped something like a bell crank.

The vertical portion B' is provided on either side with a knife edge pivot which fits within the hardened eyes formed on the lower ends of the clevis or loop C, whereby the pipe levers are supported at each corner. The horizontal projecting part $B^2$ of the bell crank carries also the knife edge fulcrum pivot F which supports the fulcrum loop or clevis G.

J represents the platform timbers to which are secured at either corner of the scale by bolts I the platform bearings H which as shown are supported at one end in the fulcrum loop G, this bearing H projecting through the box A.

It will be seen that the box A in which the loops and pipe levers are supported forms a part of the framework or coping of the scale and by arranging them in the horizontal plane of the platform instead of in the vertical plane as is usual I am enabled to so construct the scale that it will occupy less than one-half the usual depth, and as I believe I am the first to place the operating parts of a platform scale on a level with but outside the platform, and in the surrounding coping instead of beneath the platform, I herein claim broadly this arrangement of parts.

While the form shown in Fig. 1 is preferred, I have illustrated in Figs. 6 and 7 an alternative construction in which the boxes A are made of wood except for the corner iron L which is attached thereto. Furthermore, instead of having only one bell crank projection on either end of each pipe lever, I provide two, the knife edge pivots E and F, extending between the respective arms B', $B^2$ thereof. In this instance the loop G is double as shown and embraces a block G' which bears on the knife edge pivot F, instead of having the hardened eyes resting on said pivot F as in Fig. 1.

Various other details of construction will readily suggest themselves to those skilled in the art but such changes I aim to include within the scope of my invention.

It will be seen that by my construction the levers and platform are suspended in a way to allow them perfectly free vibration, and by substituting a chair or stand for the loop C, I can still further reduce the height of the scale. This scale by removing the operating levers from beneath the platform is of great value when used for weighing loose grain since it allows of a very large opening through the platform to receive the hopper.

Having thus described my invention, what I claim, and desire to secure by Letters Patent, is—

1. In a weighing scale of the character described, the platform, the surrounding coping, the supporting levers therefor, said supporting levers being arranged within the coping entirely beyond the vertical plane of the platform but practically included between the planes bounding the top and bottom thereof, substantially as described.

2. In a weighing scale, inclosing boxes A forming a part of the surrounding coping or framework of the scale, the platform, the loops C supported thereby, the levers B, the knife edge pivots E resting in bearings on the loops C said levers, loops and pivots being contained within said boxes A, and bearings H pivotally connected with the levers B and attached to the platform, substantially as described.

3. In a weighing scale of the character described the platform, casings arranged alongside the platform and forming part of the coping, and the supporting levers, arranged within said casings; substantially as described.

4. In a weighing scale of the character described the platform, the practically closed boxes A, the pipe levers inclosed therein, the bell cranks thereon, the loops, and bearings H between bell cranks and the platform; substantially as described.

5. In a weighing scale of the character described, the platform and the supporting levers and loops therefor said levers and loops being arranged entirely outside the vertical plane of the platform but practically included between the planes bounding the top and bottom thereof, with a supporting bearing as H between the levers and loops and the platform, substantially as described.

6. In combination with the platform, the pipe levers supporting the same, the inclosing boxes for said pipe levers having openings in the top for the passage of a loop and a pin or rod as D adapted to rest on the top of said box and encircled by said loop, said loop supporting the pipe levers; substantially as described.

7. In a weighing scale the combination with the supporting box having the countersunk portion, the pivot or rod D placed within said countersunk portion, the loop or clevis supported by said rod or pivot, the pipe lever B having the knife edge pivot E hung from the loop C, the knife edge pivot F, the loop G hung therefrom, the bearing H supported at one end in the loop G, all said parts being arranged within the box, the bearing H extending outside thereof and secured to the platform of the scale; substantially as described.

8. The inclosing boxes A having openings in the top at the ends for the passage of loops and having openings on one side at the ends for the passage of the levers to which the platform is attached; the openings in the top of each box being countersunk sufficiently to afford a seat for the upper end of the loops which are thus protected from wear, being below the surface of the coping substantially as described.

In testimony whereof I affix my signature in presence of two witnesses.

CHARLES C. MILLER.

Witnesses:
THOMAS BISHOP,
M. C. G. WITTE.